United States Patent [19]

Karlsson

[11] Patent Number: 4,943,240
[45] Date of Patent: Jul. 24, 1990

[54] ELECTRICAL CONNECTION

[75] Inventor: Leif E. Karlsson, Alingsas, Sweden

[73] Assignee: General Engineering (Netherlands) B.V., Netherlands

[21] Appl. No.: 380,443

[22] Filed: Jul. 17, 1989

[30] Foreign Application Priority Data

Jul. 18, 1988 [SE] Sweden .................................. 8802665

[51] Int. Cl.⁵ ........................................... H01R 35/04
[52] U.S. Cl. ..................................................... 439/15
[58] Field of Search ............................ 439/15, 164, 16

[56] References Cited

U.S. PATENT DOCUMENTS

| | | | |
|---|---|---|---|
| 4,657,326 | 4/1987 | Zeller et al. | 439/16 |
| 4,722,690 | 2/1988 | Priede | 439/15 |
| 4,744,763 | 5/1988 | Suzuki et al. | 439/164 |
| 4,797,109 | 1/1989 | Wende | 439/15 |
| 4,813,878 | 3/1989 | Schauer | 439/16 |
| 4,824,396 | 4/1989 | Sasaki et al. | 439/15 |

Primary Examiner—Gary F. Paumen
Attorney, Agent, or Firm—Spencer & Frank

[57] ABSTRACT

An electrical connection is provided adapted to be mounted on the steering wheel of a motor vehicle, for example to establish a connection with an inflatable air bag disposed at the center of the steering wheel. The connection comprises a continuous sheathed flat cable, a central region of which is coiled into a large number of helical turns, so that the cable forms a flat spiral, with the flat cable being placed on edge, so that the plane of the cable is perpendicular to the plane of the flat spiral. The ends of the cable are bent to extend out of the plane of the spiral, substantially at right angles. These projecting ends of the flat cable are encased in an extra sheath of insulating material which extends along some of the cable at the ends of the spiral and along the whole length of the projecting end parts of the cable to provide additional tensile strength at the ends of the flat cable. The ends of the cable are provided with plug-and-socket connectors.

11 Claims, 2 Drawing Sheets

ELECTRICAL CONNECTION

BACKGROUND TO THE INVENTION

This invention relates to an electrical connector and more particularly relates to an electrical connector adapted to be located in or on the steering wheel of a motor vehicle, for example to establish electrical contact with an igniter for an inflatable air bag which is disposed at the centre of the steering wheel. Such air bags have been proposed before. The igniter, when electrically activated, serves to initiate operation of a gas generator, for example when the vehicle is involved in an accident situation such as a collision. Gas from the gas generator inflates the bag, so that the bag can protect a person within the vehicle from injury.

Because the steering wheel rotates relative to the main part of the steering shaft housing, it is necessary for an electrical connection leading to the igniter to be adapted and arranged to withstand the rotations of the steering wheel. Normally the steering wheel can rotate only a limited number of turns in each direction from a normal or central position.

It has been proposed (see, for example, U.S. Pat. No. 4657326) to use an electrical connector which comprises a flat cable which is coiled to form a spiral lying within a plane. The plane defined by the cable is located at 90° to the plane defined by the spiral, and thus the flat cable is disposed "on edge" in each turn of the spiral. The flat cable is connected, at the inner end and at the outer end of the spiral, to connecting wires which project out of the plane of the spiral, in opposite directions. The connecting wires extend substantially perpendicularly to the plane of the spiral. The connecting wires, which can be round cables, are connected to the conductors present in the flat cable by soldering or by contact pins.

This known electrical connector arrangement has the advantage that the spiral permits considerable movement of the steering wheel in both directions without any risk of the cable breaking. If the steering wheel is turned in one sense the turns of the spiral contract, whereas if the steering wheel is turned in the opposite sense the turns of the spiral expand. The number of turns in the spiral is chosen based on the number of turns of the steering wheel in each direction from the normal position. This prior proposed arrangement also utilises round cable as connecting wires which have significant strength. However, the arrangement does suffer from the disadvantage that establishing contact between the round cables and the flat cable, utilising either solder or pins, is relatively expensive, and also gives rise to a considerable risk that the solder or pins may fail. This is a major disadvantage since it is not really practicable to check the circuit passing through the connector without actually operating the igniter.

The same U.S. Pat. No. 4657326 also discloses a proposal in which a flat cable is formed into a spiral as described above, but the ends of the cable are each bent completely back upon themselves along a line extending, in the plane of the cable, at 45° to the axis of the cable. Thus each end of the cable is bent back upon itself and extends out of the plane defined by the spiral. This bent portion may be restrained in a holder or nipple, and the holder or nipple may be adapted to oscillate in a bearing about an axis which is again perpendicular to the axis of the plane defined by the spiral. This arrangement, although overcoming the problems encountered using soldering or contact pins, leads to the disadvantage that the end portions of the cable, which extend away from the plane of the spiral, are of relatively small cross-section and may thus not have sufficient tensile strength.

OBJECT OF THE INVENTION

The present invention seeks to provide an improved electrical connector adapted to be located in or on the steering wheel of a motor vehicle.

It is a further object of the present invention to provide an electrical connector for use in the control circuit of an air bag mounted in the steering wheel of a motor vehicle, the connector including a multi-turn spiral of a flat cable which is mounted on edge, the cable having portions projecting from the plane defined by the spiral which has significant tensile strength, the arrangement not including any soldering or contact pins in the region where the ends of the cable emerge from the spiral.

SUMMARY OF THE INVENTION

According to one aspect of this invention there is provided an electrical connector. The connector includes a continous flat cable having conductors encased in an insulative sheath which extends throughout the connector, a central portion of the flat cable being coiled into a number of turns which define a flat spiral, the cable being coiled so that the cable is placed on edge in the turns of the spiral, with the plane defined by the cable being perpendicular to the plane defined by the spiral, two regions of the cable adjacent the ends thereof being bent so that end portions of the cable project out of the plane defined by the spiral substantially perpendicularly thereto, these end portions of the cable being encased in an extra sheath which extends along the whole length of the projecting end parts an which also extends past the bent portion of the cable along part of the spiral.

Preferably each extra sheath is an integrally cast sheath which surrounds the end portion of the flat cable.

Conveniently each extra sheath is cast of an electrically insulating material.

Preferably each extra sheath is so shaped in the region of the bent portion of the flat cable to form an abutment for securing or mounting that part of the cable in or on a covering.

Conveniently the abutment is devised for rigidly securing the cable in the cover.

Preferably the sheath is of oval cross-section, but may be round cross-section.

In one emboiment the extra sheath has a substantially flattened cross-section along at least part of its length between the end of the cable and the bend in the cable.

Preferably the ends of the cable are provided with plug-and-socket connections.

According to another aspect of the invention there is provided a connector connected to the igniter of an inflatable air bag mounted in the steering wheel of a motor vehicle, the connector being formed from a continuous flat cable, the cable having a first end region connected to the igniter, a central region and a second end region, the central region of the cable being coiled into a large number of turns, to form a flat spiral which defines a plane, the cable being placed on edge in the turns of the spiral, so that the plane defined by the cable at any point in the spiral is substantially perpendicular to the plane defined by the spiral itself, the first end portion and the second end portion extending perpendicularly away from the plane of the spiral, in opposite directions, the end portions of the cable being encased in an extra sheath which extends along the whole length of each of the projecting end parts of the cable and which extends past the bent part of the cable and along some of the cable defining the ends of the spiral.

DETAILED DESCRIPTION OF PREFERRED EMBODIMENTS

Figure 1:
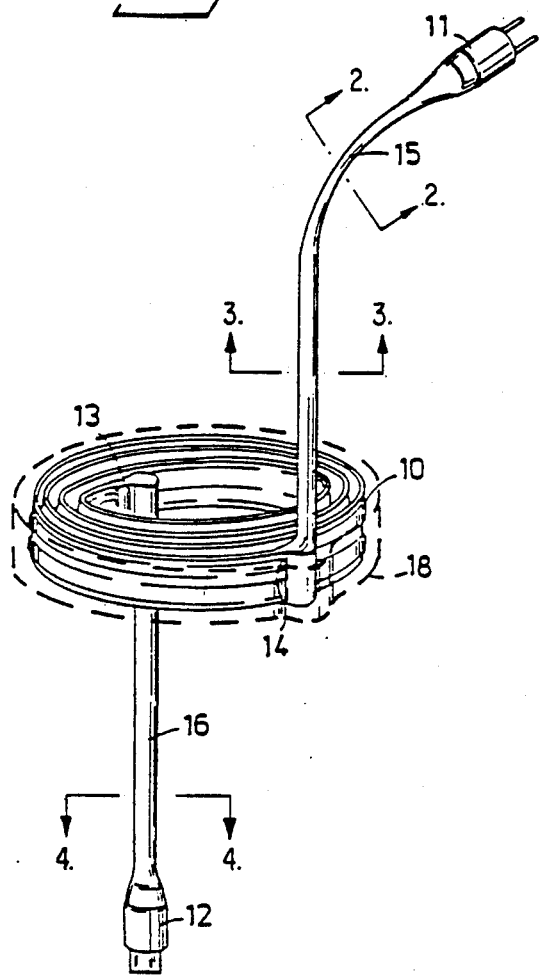
FIG. 1 is a perspective view illustrating an electrical connector in accordance with the invention.

An electrical connector in accordance with the invention is illustrated in FIG. 1. The connector is formed of a continuous cable 10, which can be considered to be a flat cable. The cable 10 comprises two coplanar conductors each of strip-like form which extend parallel with each other and which lie in a common plane, the conductors being surrounded by a thin element or sheath of insulation material. The cable thus has a width which is much greater than its thickness and so the cable is in the form of a strip or "ribbon". The two conductors extend through the cable integrally from one end to the other. Mounted on one end of the cable is a pin connection 11 and mounted on the other end of the cable is socket connection 12. Alternative forms of connection may be provided.

Th central region of the cable 10 is coiled to form a multi-turn spiral lying in a single plane. The cable 10 is actuallly "on edge" within the region of the flat spiral, so that the plane defined by the cable 10 (i.e. by the coplanar conductors in cable 10) at any point is perpendicular to a plane parallel to the spiral. Therefore, the edges of the cable lie in two parallel planes.

At regions 13, 14, adjacent the ends of the cable 10, the cable is bent to extend at right angles to the plane of the spiral, for example by bending the cable about a fold line which extends, in the plane of the cable, at 45° to the axis of the cable, so that the cable is bent back upon itself.

The described bending of the cable produces end parts 15, 16 of the cable which extend, from the spiral portion of the cable 10, perpendicularly to the plane defined by the spiral. The end parts 15, 16 extend in opposite directions from the plane of the spiral in the illustrated embodiment. The end portions of the cable are encased in an extra sheath 17, which is preferably formed of insulating material. In the illustrated embodiment the sheath 17 extends, in each case, from the connection 11 or 12, over the entire length of the end part 15 or 16, and past the regions 13 and 14 in which the cable is bent, even extending to cover the end portions of the spiral region of the cable 10.

In preferred embodiments of the invention the sheath 17 is made of a rubber or plastics composition and is cast integrally on the cable. In the regions 13 and 14 where the cable is bent the sheath 17 may be specifically formed to define an abutment or a pivot pin for securing the cable rigidly in a covering 18 which surrounds the electrical connector or pivotally within such a covering.

Figure 2:
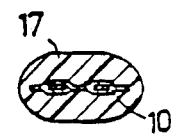
FIG. 2 is a cross-section through the connector of FIG. 1 taken on the lines A—A.
Figure 3:
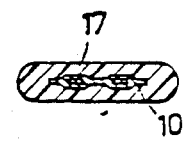
FIG. 3 is a cross-section taken through the connector of FIG. 1 on line B—B.

As can be seen from FIGS. 2 and 3 the cross-section of the sheath 17 on the end part 16 is substantially oval, and a similar cross-section is present on the portion of the end part 15 which is adjacent the coiled region of the cable 10. However, towards the connector 11 the cross-section of the sheath provided on the upper end part 15 becomes somewhat flattened, as can be seen from FIG. 3. This flattening of the cross-section facilitates bending of the end part 15. This can be advantageous when the connection 11 has to be inserted into a socket provided on the igniter of an air bag.

Figure 4:
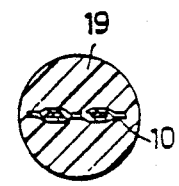
FIG. 4 is a cross-section of a modified embodiment of the invention taken as through the lines A—A.

Whilst, as can be seen from FIGS. 2 and 3, the sheath 17 provided in the embodiment of FIG. 1 is generally of oval cross-section, in an alternative embodiment of the invention a sheath 19 of circular cross-section may be provided, as shown in FIG. 4.

Figure 5:
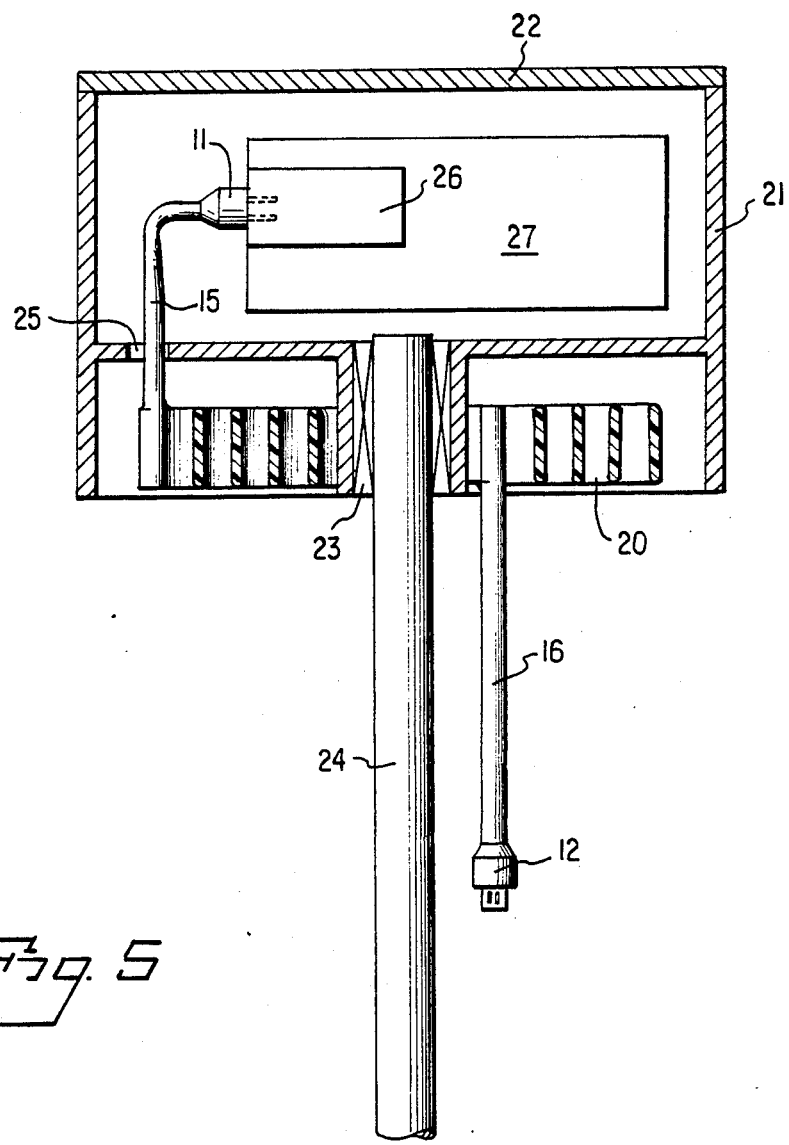
FIG. 5 is a cross-sectional view illustrating the connector of FIG. 1 in position.

Referring now to FIG. 5, the connector 20, as described above, may be mounted within a housing 21 having a removable upper cover 22, the housing being mounted by means of a bearing 23 upon a fixed steering shaft 24. The lower end portion 16 extends downwardly through the open bottom of the cavity in which the spring 20 is located, to lie adjacent the fixed shaft 24. The upper end 15 passes through an aperture 25 formed in the housing 21 into a chamber defined by the housing. The connection 11 is connected to an igniter 26 formed integrally with an air bag 27. The arrangement is such that if the igniter 26 is ignited the air bag 27 is inflated, which thus removes the cover 22 from the housing 21, permitting the inflated bag to be located in front of a person in a motor vehicle who is to be restrained by the bag.

It is to be appreciated that many modifications to the invention, as described, are possible within the scope of the claims. For example, the sheath provided on the end regions of the cable may have a cross-section which is other than that illustrated and may thus, for example, be rectangular or may have any other specific form. The end regions of the cable may also have one or more sections with a flattened, i.e. thinner, sheath to facilitate bending of the cable. The sheath may be formed to have integrally bent portions if desired. The sheath can be dimensioned to engage with the housing or the cover if so desired.

What is claimed is:

1. An electrical connector, said connector comprising a continous flat cable extending throughout the connector, said flat cable comprising conductors encased in a first insulative sheath having dimensions of width and thickness, with the width being greater than the thickness, a central portion of said flat cable being coiled into a plurality of turns which define a flat spiral, said cable being coiled so that said cable is place on edge the edges of said cable lying in two parallel planes, said cable having two end portions and two bent portions adjacent to said end portions, said bent portions being bent so that said end portions of said cable project outwardly from the spiral and substantially perpendicularly to said parallel planes, said end portions of said cable each being encased in a flexible one-pieces extra sheath which extends along the whole length of a respective one of said projecting end portions and which also extends past a respective one of said bent portions of the cable along part of said spiral.

2. A connector according to claim 1, wherein each said extra sheath is an integrally molded sheath.

3. A connector according to claim 2, wherein each said extra sheath is molded of an electrically insulating material.

4. A connector according to claim 1, wherein each said sheath extra is shaped in a region of a respective one of said bent portions of said flat cable to form an abutment for securing said region of said cable in a covering.

5. A connector according to claim 4, wherein each said abutment is shaped for rigidly securing said cable in the covering.

6. A connector according to claim 1, wherein at least one said extra sheath has an oval cross-section.

7. A connector according to claim 1, wherein at least one said sheath has a circular cross-section.

8. A connector according to claim 1, wherein at least one said extra sheath has a substantially flattened cross-section along at least part of its length between an end of said cable and the respective bent portion.

9. A connector according to claim 1, wherein said end portions of said cable are provided with plug-and-socket connections.

10. A connector connected to the igniter of an inflatable air bag mounted in the steering wheel of a motor vehicle, said connector being formed from a continuous flat cable comprising conductors encased in a first insulative sheath having dimensions of width and thickness, with the width being greater than the thickness, said cable having a first end portion connected to the igniter, a central portion, a second end portion, and bent portions, each of said bent portions being adjacent to a respective end portion, said central portion of said cable being coiled into a plurality of turns to form a flat spiral, said cable being placed on edge the edges of the cable lying in two parallel planes, said first end portion and said second end portion extending in opposite directions from the spiral and substantially perpendicular to said parallel planes, each of said end portions being encased in a flexible one-piece extra sheath which extends along the whole length thereof and which extends past a respective one of said bent portions of said cable and along a portion of said cable defining an end of the spiral.

11. A connector according to claim 1, wherein each said extra sheath is shaped in a region of a respective one of said bent portions of said flat cable to form an abutment for mounting said region of said cable on a covering.

* * * * *